US009006350B2

(12) United States Patent
Boehm et al.

(10) Patent No.: US 9,006,350 B2
(45) Date of Patent: Apr. 14, 2015

(54) SELFBONDING ENAMELS BASED ON NEW POLYESTER AMIDE IMIDES AND POLYESTER AMIDES

(75) Inventors: Frank-Rainer Boehm, Odenthal (DE); Michael Herm, Velbert (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 1282 days.

(21) Appl. No.: 12/001,835

(22) Filed: Dec. 13, 2007

(65) Prior Publication Data
US 2008/0153993 A1 Jun. 26, 2008

Related U.S. Application Data

(60) Provisional application No. 60/876,667, filed on Dec. 22, 2006.

(51) Int. Cl.
*C08G 18/83* (2006.01)
*C09D 179/08* (2006.01)

(52) U.S. Cl.
CPC .................................. *C09D 179/08* (2013.01)

(58) Field of Classification Search
USPC ....... 528/271, 330, 76, 85; 428/355 N, 423.1, 428/528; 525/123, 124, 125, 127, 424, 454, 525/455, 456
See application file for complete search history.

(56) References Cited

U.S. PATENT DOCUMENTS

| | | | |
|---|---|---|---|
| 4,420,536 A | 12/1983 | Saunders et al. | |
| 4,461,805 A | 7/1984 | Walrath et al. | |
| 4,694,051 A * | 9/1987 | Kordomenos et al. | 525/437 |
| 4,725,458 A * | 2/1988 | Harber | 427/388.1 |
| 4,751,107 A * | 6/1988 | Reiter et al. | 427/116 |
| 4,821,774 A | 4/1989 | Chorkey | |
| 4,923,034 A * | 5/1990 | Okuzawa et al. | 181/207 |
| 5,059,660 A | 10/1991 | Hoessel et al. | |
| 6,680,120 B1 | 1/2004 | Nagel et al. | |
| 6,908,692 B1 | 6/2005 | Boehm et al. | |
| 6,982,236 B2 * | 1/2006 | Wenzel et al. | 502/117 |
| 7,057,003 B2 * | 6/2006 | Detig-Karlou et al. | 528/45 |
| 2003/0026999 A1 * | 2/2003 | Schelhaas et al. | 428/425.8 |
| 2004/0132909 A1 | 7/2004 | Weikard et al. | |
| 2004/0147704 A1 | 7/2004 | Detig-Karlou et al. | |
| 2006/0069225 A1 * | 3/2006 | Wintermantel et al. | 528/44 |

FOREIGN PATENT DOCUMENTS

| | | |
|---|---|---|
| CA | 909990 | 9/1972 |
| DE | 3517753 A1 | 11/1986 |
| DE | 3612372 A1 | 10/1987 |
| DE | 3903483 A1 | 10/1989 |
| DE | 3917197 A1 | 11/1990 |
| DE | 19841977 A1 | 2/2000 |
| DE | 19903137 A1 | 8/2000 |
| EP | 461389 A1 | 12/1991 |
| EP | 1166283 | 1/2002 |
| WO | 8809359 A1 | 12/1988 |

OTHER PUBLICATIONS

Abstract of WO 00/54286A1, Sep. 14, 200, Du Pont.
Lit. Methoden der org. Chemie, Houben-Weyl, Georg Thieme Verlag, Stuttgart, 4th edition, vol. 14/2, Part 2 "Makromolekulare Stoffe", 1963, p. 61.
Frazer, "High Temperature Resistant Polymers" New York: Interscience, pp. 44-47, 1968.
Lit.: Behr, "Hochtemperaturbeständige Kunststoffe" Hanser Verlage, Munich 1969.
Cassidy, "Thermally Stable Polymers" New York: Marcel Dekker, pp. 106-115, 1980.
Mair, "Industrial Plastics" Kunststoffe 77, pp. 204-208, 1987.
ISA EPO, International Search Report and Written Opinion for International Application No. PCT/US20071025960, dated Apr. 21, 2008.
ISA EPO, International Preliminary Report on Patentability for International Application No. PCT/US2007/025960, dated Jun. 24, 2009.
KIPO, Notice of Preliminary Rejection for Korean Application No. 10-2009-7015268, dated Jan. 22, 2014.
EPO, Examination Report for European Application No. 07863123.1, dated May 16, 2014.
KIPO, Notice of Preliminary Rejection for Korean Application No. 10-2009-7015268, dated Jul. 29, 2014.

* cited by examiner

*Primary Examiner* — Michael L Leonard
(74) *Attorney, Agent, or Firm* — Ingrassia Fisher & Lorenz, P.C.

(57) ABSTRACT

A selfbonding enamel containing resins which are capable of crosslinking with one another, comprising
(A) 5 to 95 wt % of at least one resin with nucleophilic groups selected from the group consisting of OH, NHR, SH, C(O)NHR, carboxylate, CH-acidic groups and Carbanions,
(B) 0 to 70 wt % of at least one amide group-containing resin and
(C) 0 to 30 wt % of at least one polyurethane resin,
(D) 0 to 30 wt % of at least one epoxy resin,
(E) 5 to 95 wt % of at least one organic solvent,
wherein the resins of either component (A) and/or, if component (B) is contained in the composition, component (B) contain α-carboxy-β-oxocycloalkyl carboxylic acid amide groups the coatings of the selfbonding enamel have excellent adhesion to electrically conductive wires high sticking properties and high re-softening temperatures.

10 Claims, No Drawings

SELFBONDING ENAMELS BASED ON NEW POLYESTER AMIDE IMIDES AND POLYESTER AMIDES

CROSS REFERENCE TO RELATED APPLICATIONS

This application claims the benefit of U.S. Provisional Application Ser. No. 60/876,667 filed on Dec. 22, 2006 which is hereby incorporated by reference.

FIELD OF THE INVENTION

The present invention relates to a new selfbonding enamel based on new polyester amide imides and polyester amides which provides excellent adhesion on coated surfaces of electrically conductive wires and high re-softening temperatures of the coating.

BACKGROUND OF THE INVENTION

The wire-coating agents conventionally used nowadays are solutions of wire enamel binders, such as, THEIC [tris(hydroxyethyl)isocyanurate]polyesters, polyesters, polyamides, polyamide-imides, THEIC polyester imides, polyester imides or polyurethanes in suitable organic solvents, such as, cresol, phenol, benzyl alcohol, propylene carbonate or N-methylpyrrolidone, as well as diluents, such as, xylene, other substituted aromatic substances, aliphatic substances and small additions of additives, catalysts and regulators. The solvents are evaporated during thermal curing of the wire coating agents. In order to obtain a high-quality coating, it is necessary to drive out the solvents as completely as possible. In addition to the solvents, by-products of the curing reactions pass from the enamelling phase into the gas phase as occurs during crosslinking by condensation reactions.

Selfbonding enamels (wire coating compositions) are usually used to bond, for example, individual electrically conductive wires together to form a compact and fixed wound item of the electrically conductive wires. For example, electrically conductive wires are usually coated by wire coating, for example, multi-layer wire coating known by a person skilled in the art. The selfbonding enamel is applied as a top enamel on the last cured coating layer of the multi-layer wire coating. After winding of the coated and top-enameled wire to be used, for example, in rotors, stators or transformers, and after heating the resulted wound item the enamel layer is melting and flowing between the windings. The windings are stuck together in order to fix the wound item and to maintain their function.

The selfbonding enamels contain, for example, polyamides, see, for example, U.S. Pat. No. 4,420,536 and U.S. Pat. No. 4,461,805. DE-A 3612372 describes a selfbonding enamel based on a polyamide which contains imide-functional groups. Such selfbonding enamels are thermoplastic systems, and are often limited because of their low re-softening temperatures and, therefore, of low fixing properties.

Also, thermosetting selfbonding enamels can be based on polyamides, but contain additionally curing agents. DE-A 19903137 discloses a composition with a highly reactive curing agent which needs the use of two-component formulations. Other compositions contain blocked isocyanates as curing agents, for example, CA 909990, DE-A 3517753, EP-A 461389 and DE-A 3917197. The release of the blocking agent during and/or after curing of the coatings may cause emissions and blistering effects and therefore, a decrease of the sticking power, or in case of non-volatile blocking agents a softening effect because of the remaining of the blocking agent in the cured coating. Also, such compositions may limit the re-softening temperature range of the selfbonding enamels.

DE-A 3903483 describes the use of bis-maleinimide as curing agent in selfbonding enamels which requires a high thermal energy.

SUMMARY OF THE INVENTION

The invention provides a selfbonding enamel containing resins with nucleophilic groups as well as possibly amide group-containing resins which are capable of crosslinking with one another, comprising
  (A) 5 to 95 wt % of at least one resin with nucleophilic groups selected from the group consisting of OH, NHR, SH, C(O)NHR, carboxylate, CH-acidic groups and Carbanions,
  (B) 0 to 70 wt % and optionally, 1 to 70 wt % of at least one amide group-containing resin and
  (C) 0 to 30 wt % and optionally, 1 to 30 wt % of at least one polyurethane resin,
  (D) 0 to 30 wt % and optionally, 1 to 30 wt % of at least one epoxy resin,
  (E) 5 to 95 wt % of at least one organic solvent,
  wherein the resins of either component (A) and/or, if component (B) is contained in the composition, component (B) contain α-carboxy-β-oxocycloalkyl carboxylic acid amide groups and the percent by weight of (A)-(E) adds up to 100 percent.

The selfbonding enamel according to the invention allows an excellent adhesion on coated surfaces of electrically conductive wires and high sticking properties as well as provides high re-softening temperatures of the coatings. The enamelling speed can be high compared to standard selfbonding enamels without loosing their positive properties. The selfbonding enamels according to the invention are stable in storage and exhibit good adhesion to round and profiled electrically conductive wires and have adequate heat shock resistance and a high surface quality with very good electrical, thermal and mechanical properties.

DETAILED DESCRIPTION

Resins which are known for the coating of wire may be used as component A). These may be polyesters, also, polyesters with heterocyclic nitrogen-containing rings, for example, polyesters with imide and hydantoin and benzimidazole structures condensed into the molecule. The polyesters are, in particular, condensation products of polybasic aliphatic, aromatic and/or cycloaliphatic carboxylic acids and the anhydrides thereof, polyhydric alcohols and, in the case of the imide-containing polyesters, polyester amino group-containing compounds, optionally, with a proportion of monofunctional compounds, for example, monohydric alcohols. The saturated polyester imides are preferably based on terephthalic acid polyesters which may also contain polyols and, as an additional dicarboxylic acid component, a reaction product of diaminodiphenylmethane and trimellitic acid anhydride in addition to diols. Furthermore, unsaturated polyester resins and/or polyester imides, as well as, polyacrylates may also be used. As component A the following may also be used: polyamides, for example, thermoplastic polyamides, aromatic, aliphatic and aromatic-aliphatic, also polyamide imides of the type produced, for example, from trimellitic acid anhydride and diisocyanato-diphenylmethane.

Polyamides, polyester imides and/or unsaturated polyesters are preferably used.

The composition according to the invention can additionally contain one or more further binders of the type known and conventional in the wire coating industry. These may be, for example, polyesters, polyester imides, polyamides, polyamide imides, THEIC-polyester imides, polytitanic acid ester-THEIC-ester imides, phenolic resins, melamine resins, polymethacrylic imide, polyimides, polybismaleic imides, polyether imides, polybenzoxazine diones, polyhydantoins, polyvinylformals, polyacrylates and derivatives thereof, polyvinylacetals and/or masked isocyanates. Polyesters and THEIC-polyester imides are preferably used (Lit.: Behr, "Hochtemperaturbeständige Kunststoffe" Hanser Verlage, Munich 1969; Cassidy, "Thermally Stable Polymers" New York: Marcel Dekker, 1980; Frazer, "High Temperature Resistant Polymers" New York: Interscience, 1968; Mair, Kunststoffe 77 (1987) 204).

Therefore, a wire-coating composition which additionally contains phenolic resins and/or melamine resins, catalysts, nano-scale particles and/or element-organic compounds, as well as, optionally conventionally used additives and/or auxiliaries and pigments and/or fillers is preferred.

Wire-coating compositions of this type comprise
- (A) 5 to 60 wt % of at least one resin with nucleophilic groups selected from the group consisting of OH, NHR, SH, C(O)NHR, carboxylate, CH-acidic groups and Carbanions,
- (B) 0 to 50 wt % and optionally, 1 to 50 wt % of at least one amide group-containing resin,
- (C) 0 to 30 wt % and optionally, 1 to 30 wt % of at least one polyurethane resin,
- (D) 0 to 30 wt % and optionally, 1 to 30 wt % of at least one epoxy resin,
- (E) 5 to 90 wt % of at least one organic solvent,
- (F) 0 to 10 wt % and optionally 0.1 to 5 wt % of at least one catalyst,
- (G) 0 to 20 wt % and preferably 0.1 to 20 wt % of at least one phenolic resin and/or melamine resin and/or blocked isocyanate,
- (H) 0 to 3 wt % and preferably 0.1 to 3 wt % of conventionally used additives or auxiliaries,
- (I) 0 to 70 wt % and optionally, 1 to 70 wt % of nano-scale particles, and
- (J) 0 to 60 wt % and optionally, 1 to 60 wt % of conventionally used fillers and/or pigments wherein the resins of either component (A) and/or component (B) contain α-carboxy-β-oxocycloalkyl carboxylic acid amide groups and the percent by weight of (A)-(J) adds up to 100 percent.

The amide-containing resins of component (A) and/or component (B) contain α-carboxy-β-oxocycloalkyl carboxylic acid amide groups as a component which is instrumental to the invention. The α-carboxy-β-oxocycloalkyl carboxylic acid amide groups are preferably incorporated in a terminal position. The aforementioned α-carboxy groups are preferably alkyl- or aryl-esterified. α-Carboxy-β-oxocycloalkyl carboxylic acid amides of this type may be produced, on the one hand, from the corresponding carboxylic acid or the reactive derivatives thereof, such as, carboxylic acid halide groups, carboxylic acid anhydride groups or the like by reaction with amine groups. It is also expedient to use amidation auxiliaries, such as, dicyclohexylcarbodiimide during synthesis from amine and carboxylic acid. The α-carboxy-β-oxocycloalkyl carboxylic acids, in turn, may be obtained, for example, by reaction with haloformic acid esters under basic conditions and subsequent selective saponification. 1-carboxy-2-oxocycloalkanes may in turn be obtained synthetically, for example, from 1,n-carboxylic acid diesters by reaction with bases with alcohol cleavage. On the other hand, said α-carboxy-β-oxocycloalkyl carboxylic acid amides may also be produced by reaction of said 1-carboxy-2-oxocycloalkanes with isocyanates under basic condition. Said 1-carboxy-2-oxocycloalkanes may be obtained, for example, from glutaric acid dialkyl esters, glutaric acid diaryl esters, adipic acid dialkyl esters, adipic acid diaryl esters, pimelic acid dialkyl esters, pimelic acid diaryl esters, octanoic diacid dialkyl esters, octanoic diacid diaryl esters and the alkyl-, aryl-, alkoxy-, aryloxy-, alkylcarboxy-, arylcarboxy-, halogen- and otherwise substituted derivatives thereof, particularly preferably from adipic acid dimethyl and ethyl ester. The aforementioned isocyanates may be, for example, propylene diisocyanate, trimethylene diisocyanate, tetramethylene diisocyanate, pentamethylene diisocyanate, hexamethylene diisocyanate, ethylethylene diisocyanate, 3,3,4-trimethyl hexamethylene diisocyanate, 1,3-cyclopentyl diisocyanate, 1,4-cyclohexyl diisocyanate, 1,2-cyclohexyl diisocyanate, 1,3-phenylene diisocyanate, 1,4-phenylene diisocyanate, 2,5-toluoylene diisocyanate, 2,6-toluoylene diisocyanate, 4,4'-biphenylene diisocyanate, 1,5-naphthylene diisocyanate, 1,4-naphthylene diisocyanate, 4,4'-diphenylmethane diisocyanate, 2,4'-diphenylmethane diisocyanate, polynuclear isocyanates which result from the reaction of aniline, formaldehyde and COCl$_2$ having functionality of >2, 4,4'-dicyclohexylmethane diisocyanate, 2,4'-dicyclohexylmethane diisocyanate, isophorone diisocyanate, triisocyanatononane or oligomers and polymers built up from these isocyanates (for example, uretdiones, isocyanurates or the like).

Excess urethanes or ureas obtained from said isocyanates, obtainable, for example, by reaction with ethylene glycol, propylene glycol, butane diol, 1,3-propane diol, hexane diol, neopentyl glycol, trimethylol propane, glycerine, pentaerythritol and other diols, triols, tetraols, polyols or else amino alcohols, diamines, triamines and polyamines may also be used.

The aforementioned amines used for amidation may be aliphatic primary diamines, such as, ethylene diamine, propylene diamine, tetramethylene diamine, pentamethylene diamine, hexamethylene diamine, cycloaliphatic diamines, such as, 4,4'-dicyclohexylmethane diamine or else triamines, and it is also possible to use secondary amines. The amines may also be aromatic amines, such as, diaminodiphenylmethane, phenylene diamine, polynuclear aromatic amines with a functionality of >2, toluoylene diamines or corresponding derivatives. It is also possible to use amines with a further functional group in the molecule, for example, amino alcohols such as, monoethanol amine and/or monopropanol amines, or amino acids, such as, glycine, aminopropanoic acids, aminocaproic acids or aminobenzoic acids and the esters thereof.

The α-carboxy-β-oxocycloalkyl carboxylic acid amide groups may also be incorporated directly into component A). This can be achieved, for example, by reaction of the resin of component A) with di- or polyisocyanates and at least one carboxy-β-oxocycloalkane.

Preferably the component B) contains the α-carboxy-β-oxocycloalkyl carboxylic acid amide groups.

As the component E), the compositions can contain one or more organic solvents, such as, aromatic hydrocarbons, N-methylpyrrolidone, cresols, phenols, xylenols, styrenes, vinyl toluene, methylacrylates.

Catalysts, such as, tetrabutyl titanate, isopropyl titanate, cresol titanate, other titanate derivates, the polymeric forms thereof, dibutyl tin dilaurate, further tin catalysts, other metal-based catalysts, amine catalysts, such as, diazabicycloundecen, diazabicyclooctan and/or other amine catalysts known to persons skilled in the art may be used, individually or in a mixture, as the component F).

Phenolic resins and/or melamine resins which may be used as the component G) may be, for example, novolaks, obtainable by polycondensation of phenols and aldehydes or polyvinyl formals, obtainable from polyvinyl alcohols and aldehydes and/or ketones.

Blocked isocyanates, such as, NCO-adducts of polyols, amines, C—H-acidic compounds (for example, acetoacetic esters, malonic esters, etc.) and diisocyanates (for example, Lit. Methoden der org. Chemie, Houben-Weyl, Georg Thieme Verlag, Stuttgart, $4^{th}$ edition, Vol. 14/2, Part 2 "Makromolekulare Stoffe", 1963, page 61) may also be used as the component G), cresols and/or phenols conventionally being used as blocking agents.

Conventional additives and auxiliaries of component H) include, for example, conventional enamel additives, such as, extenders, plasticising components, accelerators (for example metal salts, substituted amines), initiators (for example photo initiators, heat-responsive initiators), stabilisers (for example, hydroquinones, quinones, alkylphenols, alkylphenol ethers), defoamers and flow control agents.

Nano-scale particles of component I) include particles with an average particle size in the range of 1 to 300 nm, preferably in the range of 2 to 80 nm. These are, for example, inorganic nano-scale particles based on compounds, such as, $SiO_2$, $Al_2O_3$, $TiO_2$, boronitride, silicon carbide. The particles can be, for example, compounds based on an element-oxygen network comprising elements from the series consisting of silicon, zinc, aluminium, tin, boron, germanium, gallium, lead, the transition metals and the lanthanides and actinides, in particular, from the series consisting of silicon, titanium, zinc, yttrium, cerium, vanadium, hafnium, zirconium, nickel and/or tantalum. The surface of the element-oxygen network of these particles is preferably modifiable or modified with organic groups, as described, for example, in EP-A 1166283. Said particles may be either reactive or non-reactive with the organic resin matrix, that means with component A) and/or B) and/or the further binders, for example components C), D) and/or G).

The compositions may contain as the component J) pigments and/or fillers, for example based on $SiO_2$, $Al_2O_3$, $TiO_2$, $Cr_2O_3$, for example, colour-imparting inorganic and/or organic pigments, such as, titanium dioxide or carbon black and effect pigments, such as, metal flake pigments and/or pearlescent pigments.

The coating composition can additionally contain monomeric and/or polymeric element-organic compounds. Examples of polymeric organo-element compounds include inorganic-organic hybrid polymers of the type mentioned, for example, in DE-A 198 41 977. Examples of monomeric organo-element compounds include ortho-titanic acid esters and/or ortho-zirconic acid esters, such as, nonyl, cetyl, stearyl, triethanolamine, diethanolamine, acetylacetone, acetoacetic ester, tetraisopropyl, cresyl, tetrabutyltitanate and zirconate as well as titanium tetralactate, hafnium and silicon compounds, for example, hafnium tetrabutoxide and tetraethyl silicate and/or various silicone resins. Additional polymeric and/or monomeric organo-element compounds of this type may be contained, for example, in a content of 0 to 70% by weight, in the composition according to the invention.

Component A) and component B) can enter chemical reactions during the bonding process of the composition according to the invention, that means during heating the composition. Preferably, the chemical reactions between component A) and component B) proceed during the bonding process.

Depending on the chemical nature of components A) and B), suitable reactions known to the person skilled in the art include, for example, an ester interchange reaction, polymerisation reaction, polyaddition reaction, condensation reaction. Addition reactions between component A) and B), for example, ring opening in B) by nucleophilic attack of A), are preferred. A polyester amide imide wire coating or a polyester amide wire coating is formed by the chemical reactions during the bonding process.

The selfbonding enamels according to the invention may be applied by conventional methods independently of the type and diameter of the electrically conductive wire used. The wire may be pre-coated with typical wire coating compositions as known by the art based on, for example, polyester imides, polyamides, polyamide imides, polyesters, THEIC-polyester imides and combinations thereof, usually as a multilayer coating. The selfbonding enamel is applied as a top enamel on the last cured coating layer of the multi-layer wire coating, in conventional layer thicknesses, for example, 0.3 to 25 µm per pass. The selfbonding enamel according to the invention may be then dried in an oven. Coating and drying may optionally take place several times in succession. The ovens may be arranged horizontally or vertically, the oven temperatures may lie in a range from room temperature to 800° C. The drying may be supported by irradiation with infrared (IR) and/or near infrared (NIR) radiation with techniques known for a person skilled in the art.

After drying the top-enameled wire may be wound to produce rotors, stators or transformers and by heating of the resulted wound item the enamel layer is melting and flowing between the windings, for example, at temperatures in a range of 180 to 220° C. The heating can be proceeded in an oven and may be supported by irradiation with infrared (IR) and/or near infrared (NIR) radiation with techniques known for a person skilled in the art. The windings are stuck together, and after cooling a fixed wound item is obtained.

The composition according to the invention may be used independently of the type and diameter of the electrically conductive wire; for example, wires having a diameter of 5 µm to 6 mm may be coated. The conventional metallic conductors made, for example, of copper, aluminium, zinc, iron, gold, silver or alloys thereof may be used as the wires.

The invention will be described with reference to the following examples:

EXAMPLES

Tests

Solids content 1 g, 1 h, 180° C. [%] corresponding to DIN EN ISO 3251.
Viscosity at 25° C. [mPas] or [Pas] corresponding to DIN 53015.

Example 1

Amide Group-Containing Resin as Component B 150.0 g xylene, 346.5 g Desmodur® 44 M, 0.2 g of a conventional catalyst (for example, hydroxide), 49.6 g trimethylol propane and 216.5 g 2-oxo-cyclopentyl carboxylic acid ethyl ester are heated to 70° C. in a 2-liter three-neck flask with stirrer, reflux condenser and thermometer, until the NCO number has fallen to <6.5% after approx. 4 hours. The mixture is then cooled to 40° C., 160.0 g of a polyester imide resin solution (solids content 30.2% in cresol, hydroxyl number 322 mgKOH/g) are added and heated to 140° C. A viscosity of 1040 mPas (4:4 in cresol, 25° C.) is achieved after 3 hours. The mixture is then diluted with 577.2 g cresol and the resin filtered. The resultant amidourethane resin solution has a viscosity of 5500 mPas at 25° C.

Example 2

Polyamide Selfbonding Enamels

Selfbonding Enamel 2a (Prior Art):

801 g of a polyamide solution (commercially available polyamide in a mixture of phenol and aromatic hydrocarbons, 19.8 wt %), 77 g of phenol, 112 g of a mixture of xylol isomers and 10 g of a mixture of conventional commercial surface additives and phenolic resins are made up into an selfbonding enamel while stirring. The resultant selfbonding enamel has a solids content of 16.3% and a viscosity at 25° C. of 1540 mPas.

Selfbonding Enamel 2b:

658.6 g of a polyamide solution (commercially available polyamide in a mixture of phenol and aromatic hydrocarbons, 19.8 wt %), 53.6 g of a solution of a blocked polysocyanate (Desmodur® AP in Dibasenester® DBE of DuPont, 59.7 wt %), 127 g of phenol, 150.8 g of a mixture of xylol isomers and 10 g of a mixture of conventional commercial surface additives and phenolic resins are made up into an enamel while stirring. The resultant selfbonding enamel has a solids content of 16% and a viscosity at 25° C. of 1620 mPas.

Selfbonding Enamel 2c:

658.6 g of a polyamide solution (commercially available polyamide in a mixture of phenol and aromatic hydrocarbons, 19.8 wt %), 74.1 g of the solution of Example 1, 117 g of phenol, 140.3 g of a mixture of xylol isomers and 10 g of a mixture of conventional commercial surface additives and phenolic resins are made up into an enamel while stirring. The resultant selfbonding enamel has a solids content of 16.5% and a viscosity at 25° C. of 1760 mPas.

Results

Test data according to DIN 46453 and DIN IEC 851-3:

A 0.65 mm diameter copper wire was enamelled at an oven temperature of 580° C., at 38 and 46 m/min respectively.

As base coat a typical commercially available polyesterimide wire enamel was applied. Bonding strength and resoftening temperature were measured at a coil according to table 3, DIN IEC 851-3 and DIN 46453 (baking at 170° C., 60 minutes).

|  | Enamel | | |
| --- | --- | --- | --- |
|  | 2a | 2b | 2c |
| Enamelling speed (m/min) | 38 | 38 | 38 |
| Overall increase in diameter (μm) | 65 | 65 | 66 |
| Incr. in diameter selfbonding enamel (μm) | 21 | 21 | 21 |
| surface | okay | okay | okay |
| Bonding strength (N) | 2.1 | 2.3 | 3.0 |
| Resoftening tempe. (° C.) | 188 | 233 | 264 |

It is clearly visible that the bonding strength of the enamel which corresponds to the invention (2c) is higher than that of the enamels (2a) and (2b). Furthermore, the resoftening temperature is significantly higher than the one of the enamel without crosslinker (2a) and the enamel containing a blocked isocyanate (2b).

What is claimed is:

1. A selfbonding enamel containing resins with nucleophilic groups which are capable of crosslinking with one another, comprising
   (A) 5 to 95 wt % of at least one resin with nucleophilic groups the resin selected from the group consisting of polyamides, polyester imides, and polyesters,
   (B) 1 to 70 wt % of at least one amide group-containing resin,
   (C) 0 to 30 wt % of at least one polyurethane resin,
   (D) 0 to 30 wt % of at least one epoxy resin,
   (E) 5 to 95 wt % of at least one organic solvent,
   wherein the resins of component (B) are the reaction product of 1-carboxy-2-oxocycloalkane or an alkyl or aryl ester thereof with an isocyanate under basic conditions, wherein the isocyanate is selected from the group consisting of propylene diisocyanate, trimethylene diisocyanate, tetramethylene diisocyanate, pentamethylene diisocyanate, hexamethylene diisocyanate, ethylethylene diisocyanate, 3,3,4-trimethyl hexamethylene diisocyanate, 1,3-cyclopentyl diisocyanate, 1,4-cyclohexyl diisocyanate, 1,2-cyclohexyl diisocyanate, 1,3-phenylene diisocyanate, 1,4-phenylene diisocyanate, 2,5-toluoylene diisocyanate, 2,6-toluoylene diisocyanate, 4,4'-biphenylene diisocyanate, 1,5-naphthylene diisocyanate, 1,4-naphthylene diisocyanate, 4,4'diphenylmethane diisocyanate, 2,4'-diphenylmethane diisocyanate, 4,4'dicyclohexylmethane diisocyanate, 2,4'-dicyclohexylmethane diisocyanate, isophorone diisocyanate, triisocyanatononane, and uretdiones or isocyanurates therefrom, and of further reaction with a polyester imide resin; and wherein, the percent by weight is based on the total selfbonding enamel.

2. The selfbonding enamel according to claim 1 comprising
   (A) 5 to 60 wt % of at least one resin with nucleophilic groups the resin selected from the group consisting of polyamides, polyester imides, and polyesters,
   (B) 1 to 50 wt % of at least one amide group-containing resin,
   (C) 0 to 30 wt % of at least one polyurethane resin,
   (D) 0 to 30 wt % of at least one epoxy resin,
   (E) 5 to 90 wt % of at least one organic solvent,
   (F) 0 to 10 wt % of at least one catalyst,
   (G) 0 to 20 wt % of at least one phenolic resin and/or melamine resin and/or blocked isocyanate,
   (H) 0 to 3 wt % of conventionally used additives or auxiliaries,
   (I) 0 to 70 wt % of nano-scale particles, and
   (J) 0 to 60 wt % of conventionally used fillers and/or pigments
   wherein the percent by weight is based on the total self-bonding enamel.

3. The selfbonding enamel according to claim 1 wherein the α-carboxy-β-oxocycloalkyl carboxylic acid amide groups of component (B) are in a terminal position.

4. The selfbonding enamel according to claim 2 wherein the nano scale particles are reactive with component A) and/or B).

5. The selfbonding enamel according to claim 1 wherein monomeric and/or polymeric element-organic compounds are contained.

6. A process for coating electrically conductive wires comprising the steps
   (a) applying the selfbonding enamel of claim 1 on the wire, and
   (b) drying the applied enamel.

7. The process according to claim 6 wherein the wire is a pre-coated wire.

8. A coated substrate coated with the selfbonding enamel according to claim 1.

9. A selfbonding enamel containing resins with nucleophilic groups which are capable of crosslinking with one another, consisting of:
(A) 5 to 95 wt % of at least one resin with nucleophilic groups the resin selected from the group consisting of polyamides, polyester imides, and polyesters,
(B) 1 to 70 wt % of at least one amide group-containing resin,
(C) 0 to 30 wt % of at least one polyurethane resin,
(D) 0 to 30 wt % of at least one epoxy resin,
(E) 5 to 95 wt % of at least one organic solvent,
(F) 0 to 10 wt % of at least one catalyst,
(G) 0 to 20 wt % of at least one phenolic resin and/or melamine resin,
(H) 0 to 3 wt % of additives or auxiliaries,
(I) 0 to 70 wt % of nano-scale particles, and
(J) 0 to 60 wt % of fillers and/or pigments
wherein the resins of component (B) are the reaction product of 1-carboxy-2-oxocycloalkane or an alkyl or aryl ester thereof with an isocyanate under basic conditions, wherein the isocyanate is selected from the group consisting of propylene diisocyanate, trimethylene diisocyanate, tetramethylene diisocyanate, pentamethylene diisocyanate, hexamethylene diisocyanate, ethylethylene diisocyanate, 3,3,4-trimethyl hexamethylene diisocyanate, 1,3-cyclopentyl diisocyanate, 1,4-cyclohexyl diisocyanate, 1,2-cyclohexyl diisocyanate, 1,3-phenylene diisocyanate, 1,4-phenylene diisocyanate, 2,5-toluoylene diisocyanate, 2,6-toluoylene diisocyanate, 4,4'-biphenylene diisocyanate, 1,5-naphthylene diisocyanate, 1,4-naphthylene diisocyanate, 4,4'diphenylmethane diisocyanate, 2,4'-diphenylmethane diisocyanate, 4,4'dicyclohexylmethane diisocyanate, 2,4'-dicyclohexylmethane diisocyanate, isophorone diisocyanate, triisocyanatononane, and uretdiones or isocyanurates therefrom, and of further reaction with a polyester imide resin; and wherein, the percent by weight is based on the total selfbonding enamel.

10. A selfbonding enamel containing resins with nucleophilic groups which are capable of crosslinking with one another, comprising:
(A) 5 to 95 wt % of at least one resin with nucleophilic groups the resin selected from the group consisting of polyamides, polyester imides, and polyesters,
(B) 1 to 70 wt % of at least one amide group-containing resin,
(C) 1 to 30 wt % of at least one polyurethane resin,
(D) 1 to 30 wt % of at least one epoxy resin,
(E) 5 to 95 wt % of at least one organic solvent,
wherein the resins of component (B) are the reaction product of 1-carboxy-2-oxocycloalkane or an alkyl or aryl ester thereof with an isocyanate under basic conditions, wherein the isocyanate is selected from the group consisting of propylene diisocyanate, trimethylene diisocyanate, tetramethylene diisocyanate, pentamethylene diisocyanate, hexamethylene diisocyanate, ethylethylene diisocyanate, 3,3,4-trimethyl hexamethylene diisocyanate, 1,3-cyclopentyl diisocyanate, 1,4-cyclohexyl diisocyanate, 1,2-cyclohexyl diisocyanate, 1,3-phenylene diisocyanate, 1,4-phenylene diisocyanate, 2,5-toluoylene diisocyanate, 2,6-toluoylene diisocyanate, 4,4'-biphenylene diisocyanate, 1,5-naphthylene diisocyanate, 1,4-naphthylene diisocyanate, 4,4'diphenylmethane diisocyanate, 2,4'-diphenylmethane diisocyanate, 4,4'dicyclohexylmethane diisocyanate, 2,4'-dicyclohexylmethane diisocyanate, isophorone diisocyanate, triisocyanatononane, and uretdiones or isocyanurates therefrom, and of further reaction with a polyester imide resin; and wherein, the percent by weight is based on the total selfbonding enamel.

* * * * *